Figure 1:
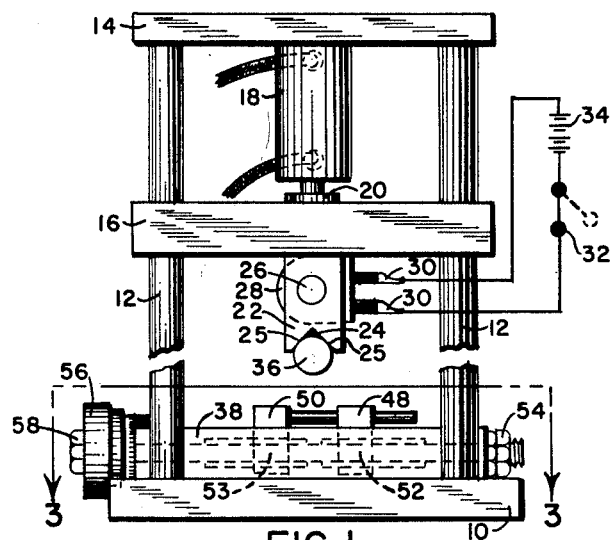

July 28, 1964 C. L. BAKER 3,142,174
BEND TEST APPARATUS
Filed Nov. 23, 1962

INVENTOR.
Cletus L. Baker
BY
Agent

United States Patent Office 3,142,174
Patented July 28, 1964

1

3,142,174
BEND TEST APPARATUS
Cletus L. Baker, Steubenville, Ohio, assignor to Titanium Metals Corporation of America, New York, N.Y., a corporation of Delaware
Filed Nov. 23, 1962, Ser. No. 239,534
6 Claims. (Cl. 73—100)

This invention relates to apparatus for bend testing a strip specimen of metal or other material.

Bend testing is employed to determine certain physical properties of metals, alloys and other materials. A strip specimen is bent around a die of known diameter and the smallest diameter die around which it can be bent without breaking, cracking or otherwise showing indications of failure demonstrates its capabilities and properties under bending deformation. The thicker the specimen, the less is its capability of being bent around a small diameter die, and therefore determination of bend characteristics is generally referred to the thickness of the specimen, signified by "T." A specimen capable of being bent without failure around a die of radius twice the thickness of the specimen is considered to be capable of a 2T bend and bend test results are generally so recorded. Material passing a 2T bend test would be better in bend properties, for example, than a material which would pass only a 4T bend since it could be satisfactorily bent around a die of less diameter related to its thickness.

Apparatus commonly used for bend testing includes male and female dies actuated by a press brake. These dies are used in pairs, the male die having a working tip with an accurately formed radius, the female die being designed to restrict the specimen outer surface to form the bend around the tip of the male die. A number of male dies are needed to cover the range of tip radii required for bend determination, and for each male die, a number of female dies must be provided to insure even reasonably accurate forming around the male die tip for specimens of various thicknesses. The number of dies required is therefore relatively large and the dies themselves must be accurately fabricated. A set of such dies to cover a reasonable range of bend radii and specimen thicknesses therefore must include a number of male dies as well as a correspondingly larger number of female dies, and such a set of dies is necessarily expensive.

A disadvantage of such bending dies is that each die set, that is a pair of male and female dies, must be designed to cover a range of specimen thicknesses. Obviously a female die cannot be provided for each possible specimen thickness since this would involve a number of dies of infinite magnitude. In order for each female die to cover a working range of specimen thicknesses, the dimension and clearances must represent a compromise which is workable for the range of useful specimen thicknesses, but may not be precisely accurate for any particular specimen thicknesses.

Figure 2:
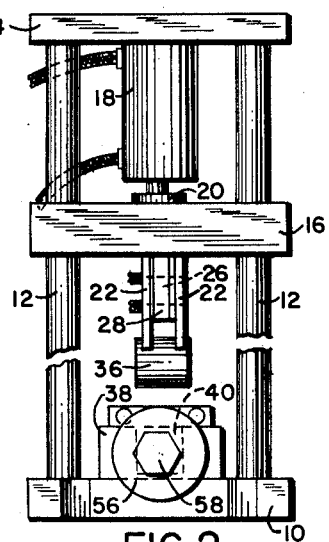
Figure 3:
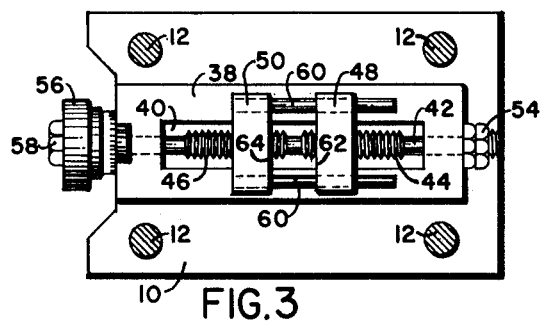
Figure 4:
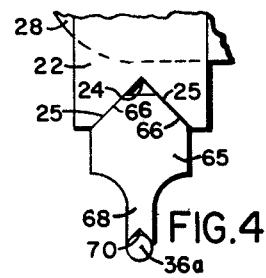
Figure 7:
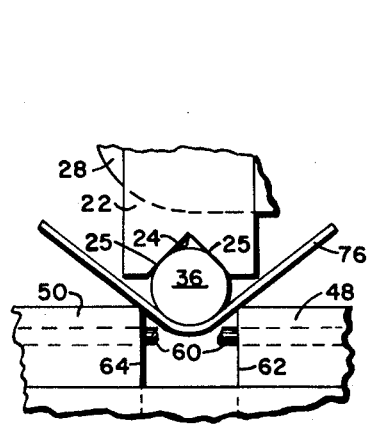
Figure 5:
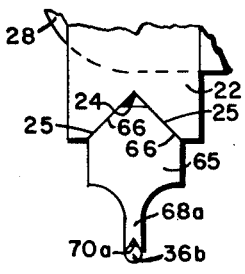
Figure 6:
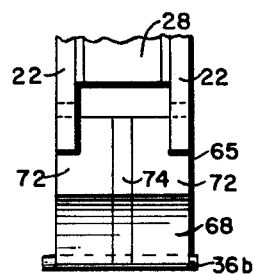

It is therefore a principal object of this invention to provide improved bend testing apparatus. Another object of this invention is to provide a simple and versatile bend testing apparatus. Yet another object of this invention is to provide bend testing apparatus which can be quickly and easily adjusted when making bend tests on strip specimens of various thicknesses. These and other objects of this invention will be apparent from the following description thereof and from the annexed drawings in which:

FIG. 1 shows a general side view of apparatus embodying features of this invention, FIG. 2 shows an end view of the apparatus of FIG. 1, FIG. 3 shows a horizontal sectional view of the apparatus of FIG. 1 taken along the line 3—3, FIG. 4 shows an enlarged side view of an adapter useful with the apparatus of FIG. 1 when using male die rods of small diameter, FIG. 5 shows an enlarged side view of another adapter useful with the apparatus of FIG. 1 when using male die rods of extremely small diameter, FIG. 6 shows an end view of the adapter of FIG. 5, FIG. 7 shows in some detail and enlarged the action of apparatus of this invention when bending a metal strip specimen.

Referring now more particularly to FIGS. 1, 2 and 3, the apparatus comprises a base 10 on which is mounted a frame consisting of vertical members such as rods 12 and a top plate member 14. Vertical rods 12 act as guides supporting slidably mounted cross member 16, which is actuated up and down by suitable means, such as hydraulic cylinder 18, having its cylinder attached to top plate 14 and the lower end of its piston rod attached to cross member 16 as at 20. Hydraulic cylinder 18 will be supplied in normal fashion with oil under pressure and conventional control valves, not shown. It will be seen that hydraulic cylinder 18 will actuate cross member 16 up and down with respect to base 10.

To a lower surface of cross member 16 are fixedly attached horizontally aligned and spaced-apart plates 22 which are of magnetic material such as iron or mild steel. Plates 22 are provided in their lower edges with aligned notches 24 formed with symmetrical and equi-angled faces 25. Attached to plates 22 and spanning the distance between them is a soft iron rod or core 26 surrounding which is solenoid coil 28. Wires 30 connected to the ends of coil 28 are in turn connected, as shown diagrammatically in FIG. 1, to switch 32, and battery 34. When switch 32 is closed, an electric current flows through coil 28, plates 22 are magnetized and are thus able to firmly hold a male die in the form of a cylindrical rod 36 in aligned notches 24 in plates 22. Since faces 25 of notches 24 are symmetrical and equi-angled a range of sizes of rods 36 may be magnetically retained in notches 24 with the center of any of such rods always aligned with the center of the notches.

On base 10 is mounted block 38 provided with channel 40. Passing through block 38 from one end to the other thereof is horizontal shaft 42 having two portions thereof symmetrically threaded in opposite hand directions. One portion of shaft 42 within channel 40 is provided with a right hand thread as at 44 and another portion of shaft 42 is provided with a left hand thread as at 46. Threaded onto threaded portions 44 and 46 of shaft 42 are each of die blocks 48 and 50, respectively. These die blocks 48 and 50 are slidably mounted on block 38 and arranged with depending bottom portions 52 and 53, slidably fitting within channel 40. Die blocks 48 and 50 are thereby mounted in spaced apart, face to face relationship.

One end of shaft 42 projecting through an end of block 38 is provided with a suitable lock nut as at 54, and the other projecting end of shaft 42 is provided with knob 56 which is mounted fixedly on its end of shaft 42 by nut 58. Die blocks 48 and 50 are provided with guide means which in the embodiment illustrated comprise rods 60 which are fixedly attached to one of the die blocks as for example die block 50, the other die block 48 being slidably mounted thereon.

The relationship of the positions of die blocks 48 and 50 with respect to the plates 22 attached to cross member 16 is such that the center of the slot between the internal vertical faces 62 and 64 of die blocks 48 and 50 is vertically below and aligned with the centers of notches 24 in plates 22. Due to the mounting of the die blocks 48 and 50 on threaded portions 44 and 46 of shaft 42 adjustment of the width of the slot between the internal vertical faces 62 and 64 of blocks 48 and 50 may be adjusted by rotation of shaft 42 conveniently by manual turning of knob 56. Because blocks 48 and 50 are threaded on oppositely threaded portions of shaft 42, adjustment of the width of the slot between these vertical internal faces will provide an increase or decrease in the width of such slot, but the center of the slot will always remain vertically aligned with the center of notches 24 in die holding plates 22 and also with the center of a die rod 36 magnetically held in notches 24.

In cases where the diameter of a rod to be used, as die rod 36, is small compared to the size of notches 24 an adapter as shown in FIGS. 4, 5 and 6 may be employed.

FIG. 4 illustrates an adapter of design to accommodate a die rod 36a of diameter somewhat less than that of rod 36 shown in FIG. 1, and FIG. 5 shows an adapter of design to accommodate a die rod 36b of diameter much smaller than of die rod 36. Referring particularly to FIG. 4, such an adapter comprises a body 65 whose top is formed with symmetrical angular shoulders 66 adapted to correspond to, and engage and mate with the surfaces 25 of notches 24 in plates 22. Fixedly attached to, or formed as an extension of, body 65 is tapering shank 68 which is provided at its bottom with a transverse triangular notch 70.

The tapering shank 68 provides a slimmer notched bottom which can magnetically hold a small diameter die rod without interfering with the action of such a small die rod in bending a specimen strip.

FIG. 5 shows an adapter to accommodate a very small die rod 36b and which is formed with the same type of body 65 as that shown in FIG. 4 and with the same type of shoulders 66. The shank 68a is, however, thinner to be of appropriate thickness for its smaller notch 70a.

FIG. 6 shows an end view of the adapter of FIG. 5 in which it will be seen that body 65 and shank 68 are of laminate construction arranged, crosswise with respect to the length of notch 70, and composed of outer layers 72 of magnetic metal such as iron or mild steel separated by an inner layer 74 of nonmagnetic material such as copper. The laminae are joined to form a unitary structure as by soldering (using silver solder) the inner copper layer 74 to the outside iron or steel layers 72.

The laminated construction insures separation of the outer layers 72 which are individually and separately contacted and mated with individual support plates 22 to provide most effective magnetic action to hold a die rod 36b in the bottom notch 70a. The adapter as a whole is constructed so that the center of its notch 70a will be vertically aligned with the center of notches 24 in plates 22 when the adapter is in working position with shoulders 66 engaging the faces 25 of notches 24, as shown.

It will be understood that various size adapters of the type illustrated in FIGS. 4, 5 and 6 may be employed to accommodate various die rod sizes, and that each of these will preferably be of laminated construction to provide most effective magnetic effect, as shown in FIG. 6.

In operation of the bend testing apparatus of this invention, hydraulic cylinder 18 is first actuated to raise cross member 16. Switch 32 is opened and a die rod 36 of diameter suitable for bending the specimen to be tested is placed in notches 24 in plates 22 and then switch 32 is closed. Magnetic attraction will hold die rod 36 firmly in position in notches 24 as shown in FIG. 1.

Then the slot between faces 64 and 62 of die blocks 50 and 48 is adjusted by rotation of knob 36 and the width of the slot is set with relation to the diameter of die rod and the thickness of the specimen to be tested. This relation may, for uniform and reproducible results, be such that the slot width equals the die rod diameter (twice its radius) plus two and one half times the specimen thickness. With the slot width adjusted, a flat strip specimen is placed across the slot resting on the top surfaces of blocks 50 and 48, and cross member 16 is lowered at a predetermined, generally uniform rate so that die rod 36 will bend such specimen, indicated at 76 in FIG. 7, in its center where it spans the slot between blocks 50 and 48. Cross member 16 is lowered until the specimen ends have been permanently bent to a predetermined angle, for example 105°, as shown. Cross member 16 is then raised by action of hydraulic cylinder 18 and the bent specimen removed. The surface of the specimen particularly in the bend area and on the outer radius, is then examined conveniently under some magnification as with a low power microscope. If no cracking or other evidence of failure is seen, the test is repeated using another specimen of the same sample sheet or strip and of course of the same thickness, and using a smaller die rod 36. In case a much smaller die rod is desirable, an adapter such as shown in FIGS. 4, 5 and 6 may be employed. With each change of die rod, the width of the slot between die blocks 50 and 48 will have to be correspondingly adjusted by rotation of knob 56 to maintain the relation of slot width=die rod diameter+2½ times specimen thickness.

If cracks are observed in the first specimen tested or it fractures, then larger die rods 36 will need to be used for subsequent tests on additional specimens. Such tests are carried out with larger or smaller die rods until determination of the smallest diameter die rod around which a specimen may be bent without indication of failure is made. The bend test result is expressed as the relation of the radius of this die rod to the thickness of the specimen. If, for example, the smallest die rod around which a specimen of 0.1-inch thickness can be bent as described without failure is of radius 0.2 inch (0.4 inch diameter) then the specimen will be capable of a 2T bend, the radius of the rod being twice the thickness of the specimen.

Comparison of test results using the bend test apparatus of this invention and a conventional set of male and female dies showed that almost identical bend test values are obtained. Table 1 below shows results testing specimens of titanium metal strip, using visual examination and 20× magnification.

*Table 1*

| Bend test apparatus of this invention | | Conventional male and female dies | |
| --- | --- | --- | --- |
| Visual | 20X | Visual | 20X |
| Heat V-947, 0.039 inch gauge | | | |
| 3.2T passed. 2.6T failed. | Passed. | 3.2T passed. 2.5T failed. | Passed. |
| Heat M-9519, 0.051 inch gauge | | | |
| 4.9T passed. 4.3T failed. | Slight cracking. | 5.1T passed. 4.4T passed. 4.4T failed. | Slight crack. Failed. |
| Heat M-9519, 0.094 inch gauge | | | |
| 3.3T passed. 2.7T failed. | Passed. | 4T passed. 3.4T failed. | Passed. |

The results above show that the results obtained using the apparatus of this invention are almost identical to those obtained using a conventional male and female die set. Actually, more accurate measurements can be made using the apparatus of this invention because of the larger possible selection of male die rods and the greater precision with which the female element (that is the adjustable die blocks) can be set.

The bend test apparatus of this invention is simple and efficient. It is more versatile than apparatus heretofore employed for bend test purposes, since the die block spacing (taking the place of a female die) may be precisely adjusted to provide proper bending of a very wide variety of specimen thicknesses for each male die rod.

The cylindrical die rods used as male dies are inexpensive to obtain, and may be simply fabricated in a large variety of diameters. The magnetically energized holder for the die rods provides firm and positive positioning while in use, and yet permits rapid release and quick changeability when different die rod sizes are needed.

The feature of engaging side faces of the notches of the support plates with the die rod surfaces provide accurate centering and alignment of a die rod regardless of its size within the size accepting range of the notch dimensions. Provision of adapters to enable smaller die rods to be effectively supported and used extends the range of die rod sizes to include whatever may be required for comprehensive bend testing. The adapter design, as described, insures that vertical alignment over the die block slot will be maintained, and that most effective magnetic force will be applied for holding a die rod.

The unique and advantageous die rod holding assembly acts in cooperation with the die block adjusting mechanism to provide properly centered bending action. The die block adjustment is quick and easy to accomplish and due to the opposite thread actuating shaft, the center of the slot between the die blocks remains vertically aligned with the center of any die rod used as a male die. Accurate and rapid bend testing of strip specimens can therefore be readily accomplished.

I claim:
1. Apparatus for bend testing comprising:
   (a) a base,
   (b) a pair of die blocks mounted in spaced apart, face to face relationship on said base to form an open slot therebetween,
   (c) a frame attached to said base supporting a cross member above said die blocks,
   (d) means for actuating said cross member vertically up and down with respect to said base,
   (e) a pair of spaced apart aligned plates of magnetic metal fixedly attached to said cross member and depending therefrom, the bottom edges of said plates being notched with the centers of said notches vertically aligned with the center of the slot formed between the said pair of die blocks,
   (f) means for magnetically energizing said plates to support a cylindrical die of magnetic metal engaging the sidewalls of the said notches in the bottoms thereof, and
   (g) means for adjusting the spacing between said die blocks while maintaining the center of the slot therebetween vertically aligned with the centers of the said notches in said plates.

2. Apparatus according to claim 1 in which the means (f) for magnetically energizing the cylindrical die rod support plates comprise a magnetic metal core connected at each end to one of said support plates and a solenoid coil surrounding said core.

3. Apparatus according to claim 1 in which the means (g) for adjusting the spacing between said die blocks comprise a shaft having two portions thereof threaded symmetrically in opposite hand directions with each of said die blocks threaded on to one of said threaded portions and means for rotating said shaft.

4. Apparatus according to claim 1 including an adapter of magnetic material having a body with symmetrically angled shoulders in its top adapted to engage and mate with the faces of the notches in the bottoms of said support plates, said body having a tapered shank and a notched bottom adapted to support when magnetically energized a small diameter die rod vertically aligned with the centers of the notches in the bottoms of said support plates.

5. Apparatus according to claim 4 in which the said adapter is of laminate construction with a center portion of non-magnetic material separating the outer layers which are individually and separately contacted and mated with individual support plates.

6. Apparatus according to claim 5 in which the said center portion is of copper.

References Cited in the file of this patent
UNITED STATES PATENTS

| 974,269 | Hildreth | Nov. 1, 1910 |
| 1,336,928 | Simmons | Apr. 13, 1920 |
| 2,338,338 | Kieckhefer | Jan. 4, 1944 |
| 2,422,800 | Ransom | June 24, 1947 |
| 2,645,937 | Skalmusky et al. | July 21, 1953 |

OTHER REFERENCES

"The Testing and Inspection of Engineering Materials," H. E. Davis et al., 2nd edition, 1955, McGraw-Hill Book Co., Inc., pages 156–158.